United States Patent

Molby

[15] 3,688,860
[45] Sept. 5, 1972

[54] TWO SPEED STEERING SYSTEM

[72] Inventor: Lloyd A. Molby, 1900 Franklin Drive, Longview, Tex. 75601

[22] Filed: April 27, 1971

[21] Appl. No.: 137,836

[52] U.S. Cl. .............................. 180/79.2 B, 60/52 S
[51] Int. Cl. ............................................ B62d 5/08
[58] Field of Search ....... 180/79.2 R, 79.2 B; 60/52 S

[56] References Cited

UNITED STATES PATENTS

| | | | |
|---|---|---|---|
| 3,249,173 | 5/1966 | Gordon | 180/79.2 R |
| 3,340,949 | 9/1967 | Molby | 180/79.2 B |
| 3,439,768 | 4/1969 | Medley | 180/79.2 B |

FOREIGN PATENTS OR APPLICATIONS 711,192   6/1954   Great Britain .............. 60/52 S Primary Examiner—Benjamin Hersh
Assistant Examiner—Leslie J. Paperner
Attorney—Wofford, Felsman & Fails

[57] ABSTRACT

A two speed steering system for use with articulated vehicles, characterized by a steering wheel; a power steering servo; primary and secondary controls carried by one section of the articulated vehicle for controlling the speed with which the power steering servo steers; a double bar link that is pivotally connected with the primary and secondary controls and with an interconnection link between it and the other section of the vehicle; the interconnection link being disposed laterally from the pivot connection so that it tends to restore the double bar link in response to actual steer imparted to the sections of the articulated vehicle. The primary control has a weak spring that permits its movement, within its limits, before movement of the secondary control, with its stronger spring, is effected. Thus, a first speed of steering is effected by the primary control, but if a greater magnitude is signaled than the primary control is adapted to effect, the secondary control is brought into play to speed up the steering. Also disclosed are specific and preferred embodiments of apparatus.

13 Claims, 7 Drawing Figures

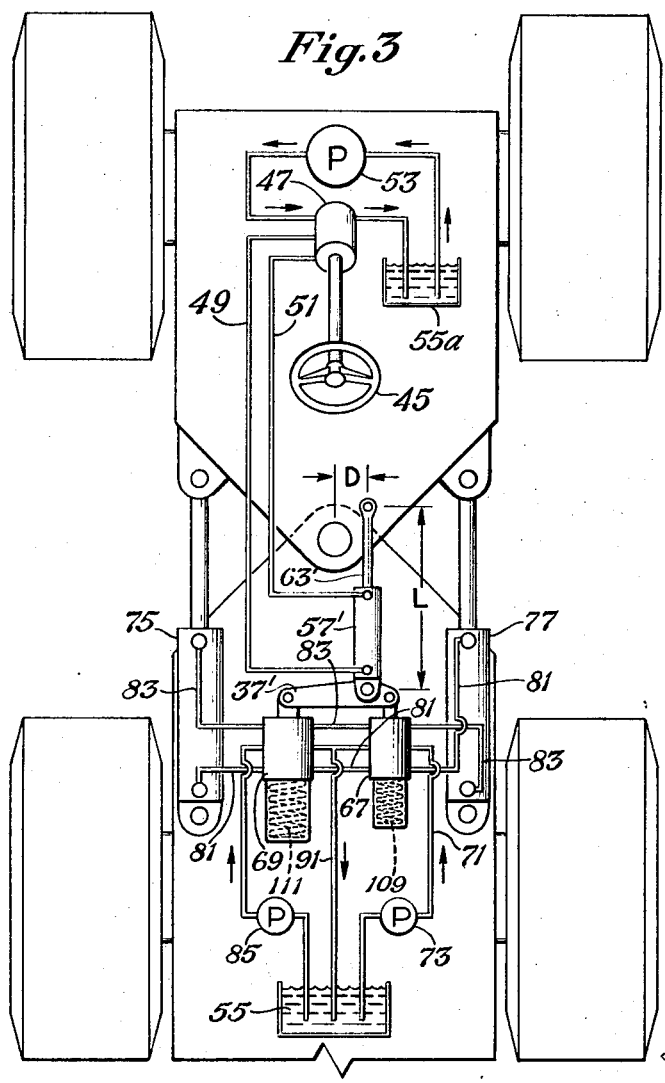
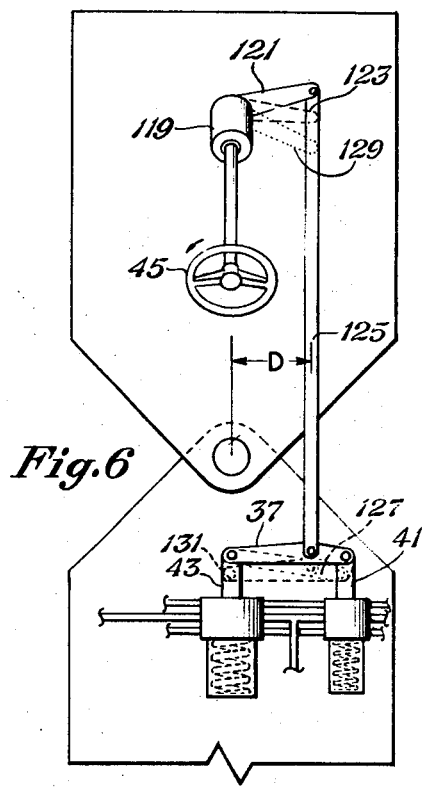
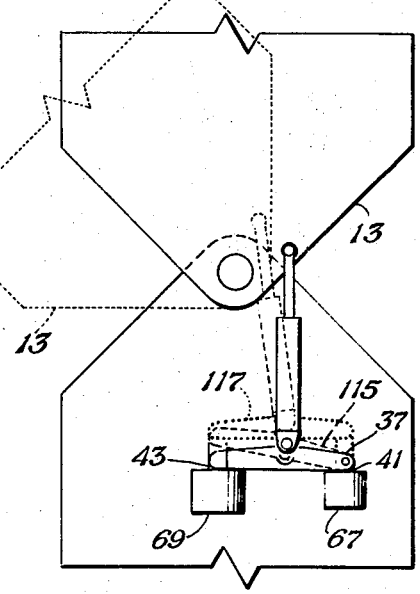
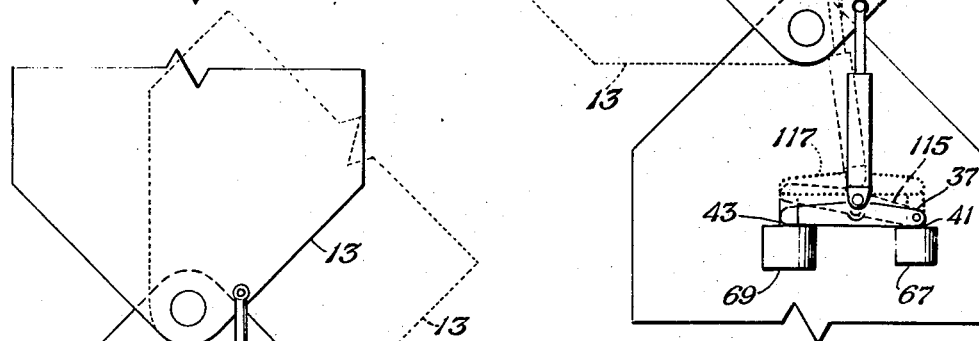
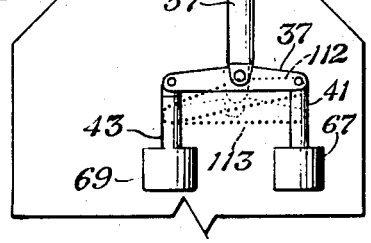
INVENTOR
Lloyd A. Molby
BY
Wofford, Felsman & Fails
ATTORNEYS 3,688,860

TWO SPEED STEERING SYSTEM

BACKGROUND OF THE INVENTION

1. Field of the Invention

This invention relates to a power steering system of the follow-up type for use with articulated vehicles. More particularly, this invention relates to a variable rate steering system in which the power steering servo is controlled at variable rates with at least two maximum speeds of steer.

2. Description of the Prior Art

A wide variety of power steering systems are known in the prior art. There are a large number of the power steering systems that are applicable to steering of articulated vehicles. Ordinarily, the prior art power steering systems employ an electric motor or a hydraulic ram arrangement in conjunction with a moment arm means to change the angle of one section of an articulated vehicle with respect to another section thereof. The power to the power steering servo means is ordinarily controlled by one control that is moved responsively to the movement of the steering means such as a steering wheel or steering switch. A major step forward was effected in patents such as the Molby U.S. Pat. No. 3,340,949 incorporating into the steering train a mounting that is also responsive to the degree of steer of one section of the articulated vehicle; the mounting being emplaced with respect to the vertical axis of the pivot connection, sometimes called a steering axis, so as to introduce into the rate of steer a desired variation. In the Molby U.S. Pat. No. 3,340,949, the variation increased the rate of steer per unit steering signal as the degree of steer from 0° increased.

The prior art steering systems have not provided a simple linkage arrangement providing slow, precise, low horsepower steering with an option of fast, high horsepower steering, selectable by the operator and dependent only on the magnitude indicated on a steering means. Particularly, the prior art has not provided a hydraulic system having improved oil metering through two control valve means enabling precisely controlling low flow rates for low speed steering; and, thereafter, employing a second volume flow rate of hydraulic fluid from a supplementary source. Consequently, the prior art steering systems have not had the best overall control of the horsepower and heating of the hydraulic fluid used in steering.

BRIEF DESCRIPTION OF THE DRAWINGS

FIG. 3 is a top plan view, partly schematic, of another embodiment of this invention, also employing hydraulic power steering.

FIG. 4 is a partial top plan view illustrating am embodiment incorporating the reaction of a steered section into the steer system when steering in one direction;

and FIG. 5 is a partial plan view of the embodiment of FIG. 4 when the steered section is steered in the opposite direction.

FIG. 6 is a partial plan view of an embodiment of this invention incorporating a mechanical interconnection means intermediate the double bar link means and the steering means in accordance with another embodiment of this invention.

DESCRIPTION OF PREFERRED EMBODIMENTS

It is a primary object of this invention to provide an improvement in power steering systems for articulated vehicles wherein the variable rate of steering is effected by providing two control means that are responsive both to the movement of the steering means and to the degree of steer of the sections of the articulated vehicle and provide at least two steering speeds; also obviating the disadvantages of the prior art structure.

It is also an object of this invention to provide a hydraulic steering system for an articulated vehicle employing primary and secondary control valves and primary and secondary sources of hydraulic fluid; the secondary source being a high volume rate of flow source that is optionally operable only during periods of peak demand, if desired.

It is also an object of this invention to provide a variable rate steering system that will enable steering a vehicle back to a primary repair location in the event of a failure of a primary steering element, or component.

Other objects of this invention will be apparent to those familiar with the art when the following description is read in conjunction with the drawings.

Figure 1:
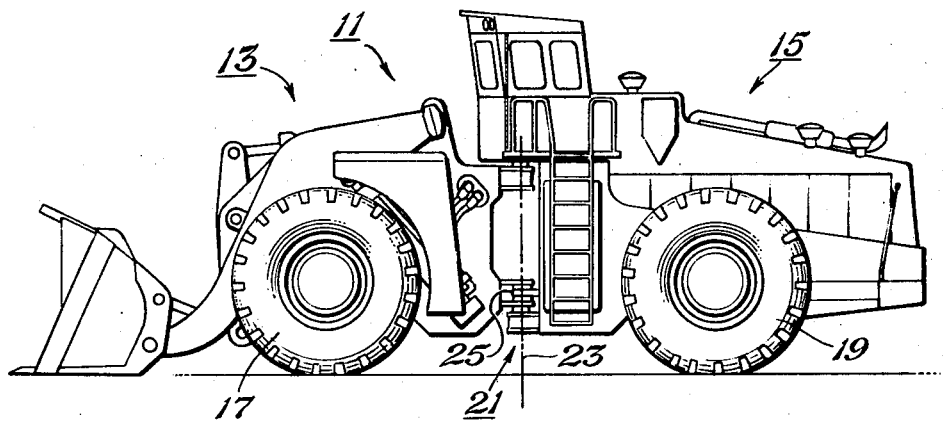
FIG. 1 is a side elevational view of an articulated front end loader vehicle employing one embodiment of this invention.

Referring to FIG. 1, the present invention is shown incorporated in an articulated vehicle 11 having a front section 13 and a rear section 15. The front section 13 has a pair of front wheels 17. The rear section 15 has a pair of rear wheels 19. The front and rear sections 13 and 15 are pivotally connected via pivot connection 21 for horizontal steering movement relative to one another about a substantially vertical steering axis 23. Specifically, a conventional hydraulic ram, comprising a cylinder, piston and shaft arrangement, is connected to the front and rear sections on one or both sides of the pivot connection and effects the desired degree of steering via a steering connection 25 in response to the steering means in the operator's console. The steering connection 25 is disposed laterally from the pivot connection 21 for a desired moment arm over which the steering force can be applied. Any other conventional methods of steer may be employed.

Figure 2A:
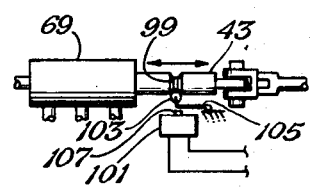
FIG. 2a is a partial side elevational view, partly schematic, of one embodiment of a control valve that is suitable for at least part of a control means such as the secondary control means.
Figure 2:
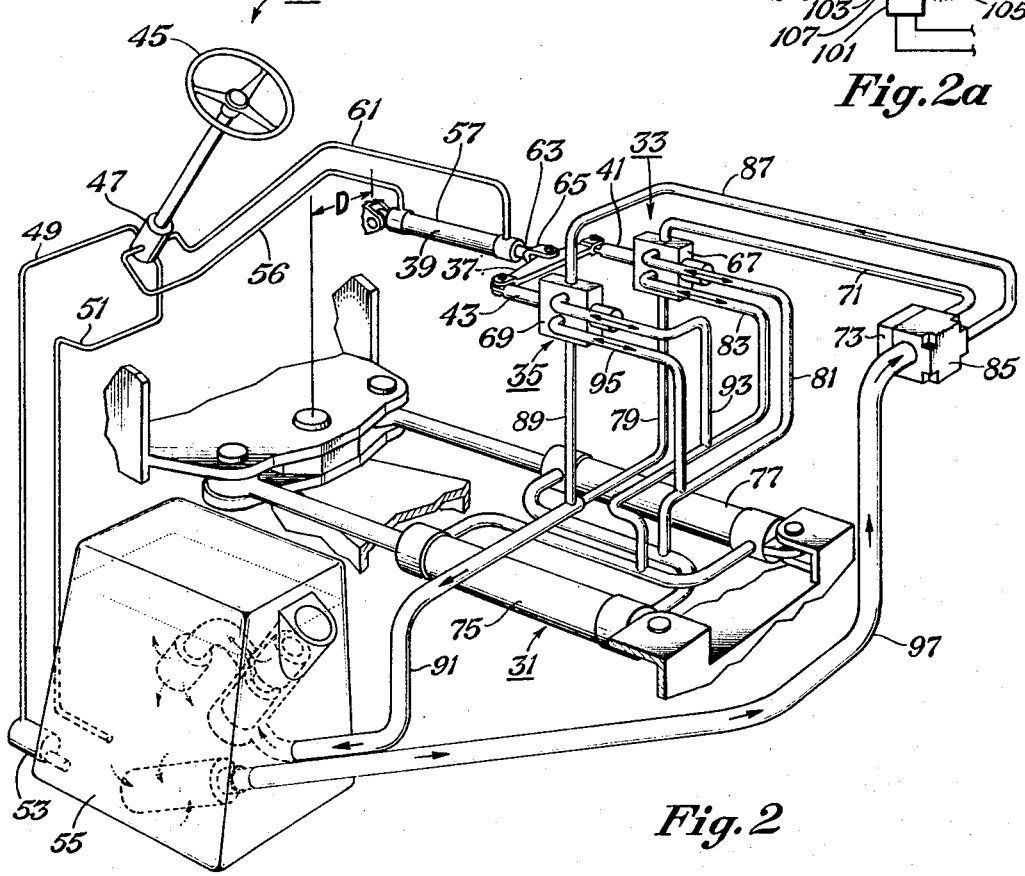
FIG. 2 is a schematic isometric view of an embodiment of this invention employing hydraulic power steering.

One embodiment of the steering system is illustrated schematically in FIG. 2. Basically, the steering system of the invention comprises the major assemblies and elements of steering means 29, power servo means 31, primary control means 33, secondary control means 35, double bar link means 37 and interconnection means 39. The steering means 29 is movable in at least two directions in varying amounts to indicate varying scalar magnitudes of, or varying degrees of, steer in the predetermined directions. The power servo means 31 is connected with both of the sections and has a moment arm means for applying a torque force about he pivot connection for effecting the desired degree of steer in ultimate response to movement of the steering means a predetermined amount in a predetermined direction. The primary and secondary control means 33 and 35 are stationarily disposed on one of the sections of the vehicle. They are connected with the power servo means 31 for controlling the direction and speed with which the power servo means steers in response to the indicated degrees of steer by the steering means 29. The primary and secondary control means 33 and 35 have respective first and second members 41 and 43 that are positionable to control the direction and magnitude of an output which controls the direction and speed of the power servo means 31. The primary control means 33 has a weak biasing means that biases its first member 41 toward the neutral, or shut-off, position. The secondary control means 35 has a strong biasing means that biases its second member 43 toward the shut-off position with a force sufficient to resist movement of the second member until the first member approaches its limit of travel in a predetermined direction and a supplemental resistance, in addition to the weak biasing means, is encountered by the double bar link means 37.

The double bar link means 37 is pivotally connected at each end with the first and second members 41 and 43. It is pivotally connected thereto so as to be able to move the first member to approach its limit of travel in a predetermined direction; and, only thereafter, move the second member upon further movement of the double bar link means 37 in the predetermined direction by the interconnection means 39. The interconnection means 39 connects the steering means with the double bar link means so as to move the double bar link means responsively in a predetermined direction a magnitude corresponding to the magnitude and direction of movement signaled by the steering means 29. Additionally, the interconnection means 39 is also connected with the other section of the vehicle at a point spaced from the pivot connection such that the longitudinal axis of the portion of the interconnection means 39 that is connected with the double bar link means 37 is disposed at a distance D from the substantially vertical steering axis defined by the pivot connection. In this way, the double bar link means 37 is also moved in a direction opposite to the predetermined direction of steer in response to the degree of steer that is actually imparted to the steered section, as determined by movement of one of the sections with respect to the other section of the vehicle. Expressed otherwise, as the vehicle is steered toward the desired degree of steer, a feedback is effected such that the primary and secondary control means are automatically restored to their shut-off positions upon reaching of the predetermined degree of steer.

The following, more detailed description is given with respect to the specific embodiment illustrated in FIG. 2. Therein the steering means 29 comprises a steering wheel 45 that operates a gerotor 47. The gerotor 47 is a combination pump and valve which is used to supply fluid such as hydraulic fluid in a given direction at a given rate as long as it is supplied with fluid under pressure, but to operate as a pump to continue to supply the fluid manually if the source of fluid should fail. The gerotor is commercially available from Char-Lynn, Eden Prairie, Minnesota. The gerotor 47 is connected via conduits 49 and 51 with a pump 53 which takes supply from a sump, or reservoir, 55. The conduit 51 returns hydraulic fluid to the sump 55. Any other combination of valve and pump, instead of the gerotor 47 and pump 53, may be employed to effect positioning of the hydraulic ram 57 that is employed as the interconnection means 39. Specifically, the hydraulic ram 57 comprises a slave cylinder, piston and shaft assembly that is connected by conduits 56 and 61 with the gerotor 47. The piston (not shown) within hydraulic ram 57 moves reciprocally in response to the quantity and direction of flow of the hydraulic fluid so as to reciprocally move the shaft 63 and the double bar link means 37. The shaft 63 has a yoke 65 that is pivotally connected via appropriate stub shaft such as a nut and bolt with the double bar link means 37. As indicated, the double bar link means 37 is connected with first and second members 41 and 43. The primary and secondary control means 33 and 35, as illustrated, comprise respective fluid flow valves 67 and 69 for controlling the flow of hydraulic fluid. Consequently, flow of hydraulic fluid in a given direction is effected in response to movement of the double bar link means. Specifically, the shaft 63 is connected at approximately the midpoint of the double bar link means 37. The force of the respective first and second springs (not shown) in the primary control valve 67 and the secondary control valve 69 will directly control the force with which the first and second members 41 and 43 are returned to the shut-off position. If desired, the force exerted by the interconnection means 39 also may be distributed unequally to the respective valves, as by having the shaft 63 connected to the double bar link means closer to the primary control valve 67 than to the secondary control valve, as illustrated in FIG. 3.

The primary control valve 67 is connected via conduit 71 with a first source of hydraulic fluid under elevated pressure; such as, pump 73. The primary control valve 67 is a four-way control valve which vents the hydraulic fluid via a pressure output to a high pressure side of the hydraulic rams 75 and 77 serving as the power servo means 31, and returns low pressure fluid to sump 55. The hydraulic rams 75 and 77 are double acting and the hydraulic fluid is conveyed from the low pressure side of each hydraulic ram to the primary valve where it is then vented to the sump 55 through conduit 79. Either of the conduits 81 or 83 may serve as the high pressure conduit depending upon the direction of steer that has been indicated; that is, whether the first member 41 is moved inwardly or outwardly in the primary control valve 67. Ordinarily, the pump 73 will be a low horsepower pump and may have relatively low capacity with relatively low pressure capability. The pressure capability may be relatively high, if desired, of course.

The secondary control valve 69 is connected with a source of fluid at elevated pressure; such as, hydraulic pump 85; by way of conduit 87. Similarly, as described with respect to the primary control valve 67, the secondary control valve is a four-way valve which effects flow of the hydraulic fluid at elevated pressure to the high pressure side of the hydraulic rams 75 and 77; and vents the low pressure fluid from the low pressure side of the hydraulic rams 75 and 77 back to the reservoir through conduits 89 and 91. Either of the conduits 93 and 95 may serve as high pressure conduits supplying a relatively large flow of hydraulic fluid at relatively high pressure to the high pressure side of the hydraulic rams 75 and 77, or serve as the low pressure conduit returning the hydraulic fluid from the low pressure side of the hydraulic rams 75 and 77. The respective sources of hydraulic fluid 73 and 85 are connected with the sump 55 via conduit 97 for supplying the fluid at elevated pressure for operating the hydraulic rams 75 and 77. If desired, a unitary hydraulic pump with pressure taps at different predetermined pressures and predetermined flow rates may be employed, instead of the dual pumps 73 and 85. The use of the dual pumps 73 and 85 is advantageous, however, in that the second pump 85 supplying the relatively large quantity of fluid at a relatively high pressure to the secondary control valve 69 may remain off until a need for it is indicated.

When the latter arrangement is employed, a secondary control valve 69 such as illustrated in FIG. 2a may be employed. Therein, the second member 43 has a groove means 99 disposed peripherally around it. Disposed adjacent the groove means 99 is a switch means 101, with actuation means. The actuation means includes a roller 103 that is disposed along a pivotally mounted lever arm 105 to depress a plunger 107 of the switch means 101 to effect starting of the secondary pump 85 when the first member 43 is moved inwardly or outwardly. Expressed otherwise, movement of the groove means 99 reciprocally in either direction will depress the roller 103 and the plunger 107 to complete an electrical circuit and start a suitable electric motor (not shown) driving hydraulic pump 85. The high pressure hydraulic fluid discharged from the pump 85 is then directed in the indicated direction by the secondary control valve 69.

FIG. 3 is a plan view, mostly schematic, illustrating an embodiment similar to that of FIG. 2. In FIG. 3, however, the hydraulic ram 57' is illustrated as being inverted such that the shaft 63' is connected with the one section of the vehicle whereas the cylinder is connected with the double bar link means 37'. Moreover, the double bar link means 37' is illustrated with disproportionate, or unequal, moment arms such that the primary force of the hydraulic ram 57' will be directed at the primary control valve 67 with its relatively weak spring, or springs, 109. This helps to ensure that the primary control valve 67 moves first before the secondary control valve 69 is moved.

The FIGS. 4 and 5 are also partial plan views, mostly schematic, to facilitate understanding the operation of the invention. Referring to FIGS. 2–5 for operation, the steering wheel 45 is turned a predetermined magnitude in a predetermined direction. Hydraulic fluid from a reservoir 55a, FIG. 3, or sump 55, FIG. 2, is supplied by pump 53 to the gerotor 47. The gerotor 47 routes the hydraulic fluid at elevated pressure to the hydraulic ram 57 or 57' via conduits 49 or 51. For example, if the steering wheel 45 is turned to the right, the hydraulic ram is shortened by retracting the shaft 63, as illustrated in FIGS. 2 and 4. This effects a length L which is maintained as long as the steering wheel is maintained in its position. This length L effects movement of the double bar link means 37 forwardly to pull out first the first member 41 to start a steer to the right. Referring to FIG. 4, as the double bar link means 37 is pulled forwardly to indicate a turn to the right, the primary valve 67 is opened first. Accordingly, the hydraulic fluid supplied by pump 73, FIGS. 2 and 3, is routed via the primary control valve 67 to the high pressure side of the hydraulic rams 75 and 77. As illustrated, the high pressure hydraulic fluid is routed from conduit 71 through conduit 81 to the piston end of hydraulic ram 75 to extend it, and the shaft end of hydraulic ram 77 to retract it; and effect the steer to the right. As a further degree of steer is signaled by further rotation of the steering wheel 45, the double bar link means is drawn further outwardly, or forwardly, as indicated by dotted line 112. As the first member 41 approaches its limit, the second member 43 is begun to be drawn outwardly, because the force exceeds the force of the biasing means; such as, spring 111, FIG. 3; tending to hold it in the shut-off position. At full steer to the right, the length of the interconnection ram 57 is shortened such that both the first and second members 41 and 43 are fully extended, as illustrated in solid lines in FIG. 4. At this point hydraulic fluid is also routed from secondary pump 85 through the secondary control valve 69 and sent through conduit 81 to effect a high horsepower, high rate of steer to the right. It is possible to have the secondary pump 85 operate only upon demand and ensure precise control with no problem of overheating of the fluid or having to dissipate, or waste, quantities of heat by having the high flow pump running all the time, or use a single larger source that runs continuously to circulate the hydraulic fluid.

As the section 13 is steered to the right, the secondary control valve 69 is closed first by inward movement of the second member 43, the position of the double bar link means being indicated by dotted line 112. As the section 13 continues to steer in the indicated direction until it reaches the signaled degree of steer, the double bar link means 37 is returned to the neutral position, indicated by dotted lines 113, to close the primary valve 67 also. Accordingly, the indicated degree of steer is retained until the steering wheel 45 is moved. Thus, it can be seen that there is feedback which effects an automatic return to a neutral position of the control valves so that steer of the vehicle is stopped and maintained at the signaled degree of steer.

If, on the other hand, it is desired to steer to the left, the steering wheel 45 is rotated to the left. The pump 53 supplies hydraulic fluid from the sump 55a. The hydraulic fluid is routed by gerotor 47 to the hydraulic interconnection ram 57 to cause it to elongate, or extend, into a new length $L_1$. Consequently, the double bar link means 37 is moved inwardly to first displace the first member 41 inwardly, as illustrated by dashed line 115, FIG. 5. This effects a low speed, precise steer to the left. If the steering wheel is steered further to the left, the length of the hydraulic interconnection ram 57 becomes sufficient to overcome the resistance of the strong biasing means in the secondary control valve 69, such that the second member 43 is also depressed inwardly, FIG. 5, to effect a high rate of flow of the high pressure hydraulic fluid to the high pressure side of the hydraulic rams 75 and 77. In this direction of steer, the hydraulic fluid is routed through conduit 83 to the piston side of the hydraulic ram 77 and to the shaft side of hydraulic ram 75 to effect the steer to the left.

As indicated hereinbefore, when high pressure fluid is routed through conduits 81 and 95 to the high pressure side of the hydraulic rams, the low pressure fluid is routed through the conduits 83 and 93 to the control valves and thence to the sump 55. The conduits 93 and 95 from the secondary control valve to the respective conduits 83 and 81 are not shown in FIG. 3, since they serve merely to connect the pumps in parallel to the same conduit to the respective ends of the hydraulic rams.

In any event, as the steer of the first section 13 of the vehicle nears completion, the second member 43 of the secondary control valve 69 is returned to its shut-off position first to make the transition smoothly from the high rate of fluid flow effected by both valves to the low rate of fluid flow effected by the primary control valve. This position is indicated by the dashed line 115, FIG. 5. Subsequently, the first member 41 is also returned to its shut-off position, indicated by dotted line 117, FIG. 5. Thus, the desired degree of steer is attained and is maintained until the steering wheel 45 is moved to another position.

When the steering wheel is returned to zero degrees of steer from any steer, the converse of the operation described hereinbefore is effected. Specifically, if the steering wheel is moved slowly back to neutral, only the primary control valve is operated to effect a precise, low speed return to zero degrees of steer. If, on the other hand, the steering wheel is rotated rapidly back to the neutral position, a high rate of steer back to zero degrees of steer is effected. The converse of the operation described hereinbefore occurs. That is, the primary valve is operated first; and, if a rate of steer is signaled that is greater than the capabilities of the primary control valve, the secondary valve is operated to effect the high rate of steer. In any event, there is always a smooth transition as the signaled degree of steer is approached because the steered section of the vehicle positions the interconnection member and the double bar link means so as to return the second member 43; and then the first member 41 to the shut-off position just as the signaled degree of steer is effected.

The steering system has been described hereinbefore with respect to employing a hydraulic ram as the interconnection means and a hydraulic flow control valve in the steering means for effecting a desired length of the interconnection means. If desired, a mechanical linkage and a mechanical steering system employing a pitman arm may be employed, as illustrated in FIG. 6. Therein, the steering wheel 45 has a conventional steering gear box 119 attached to its lower end. A pitman arm 121 is connected with the steering gear box 119 so as to move in a direction opposite to the direction in which the steering wheel 45 is rotated. For example, as illustrated, when the steering wheel 45 is turned to the left, or counterclockwise, to signal a steer to the left, the pitman arm 121 is moved downwardly in a clockwise direction, indicated by dashed line 123. The longitudinally extending link 125, serving as the interconnection means, is connected with the pitman arm 121 so as to translate downward movement of the pitman arm 121 in a respective direction into movement of the double bar link means 37 in that direction. For example, the downward movement of the pitman arm 121 is reflected, first, in the positioning of the double bar link means 37 as illustrated by dashed lines 127. As the pitman arm 121 is moved further downwardly as indicated by dotted lines 129, the limit of the movement of the first member 41 is reached and the second member 43 is depressed, as indicated by dashed line 131. Thus, it can be seen that the movement of the double bar link means is effected as was described hereinbefore to effect the low speed, precise steer, or the high speed steer; as demanded by movement of the steering wheel 45. The difference is that the link 125 has a constant length that is connected to, and moved in response to movement of, the pitman arm; instead of varying the length of a hydraulic ram connected via a pivotal connection with the steered section of the vehicle as was described with respect to FIGS. 1–5. The total effect is the same, however, since the length assumed by the hydraulic ram 57 in response to a given degree of steer signal is retained throughout a turn, or until the steering wheel 45 is moved to a new position.

In the embodiment of FIG. 6, feedback is effected by steer of a section of the vehicle, as described hereinbefore. Specifically, it can be seen that the longitudinal axis of the link 125 is spaced a distance D from the vertical steering axis of the pivot connection The link 125 is also pivotally connected with the pitman arm and with the double bar link means so as to be able to position the double bar link means, not only in response to direct movement of the pitman arm because of the movement of the steering wheel 45, but also to afford a feedback, or a restoring force, to restore the double bar link means 37 to the shut-off position when the signalled degree of steer has been effected.

In the embodiments of FIGS. 1–5, the steering means may be employed on either of the sections of the vehicle. It is imperative only that the interconnection means be connected with one section of the vehicle and the primary and secondary control valves be connected with the other section of the vehicle to obtain the restoring action as one section is steered with respect to the other. On the other hand, in the embodiment of FIg. 6 in which the interconnection means is connected to the pitman arm of the steering gear box 119, it is imperative that the steering gear box and the pitman arm 121 be connected with the one section of the vehicle opposite that to which the primary and secondary control valves are connected to to effect the requisite restoring action upon the completion of the signaled degree of steer.

A variety of apparatus and linkages will occur to one skilled in the art that are equivalent to those described herein, once the principle of applicant's invention is made clear by his specification. For example, the term double bar link means is employed herein for the double bar link means 37. It is apparent that a variety of other linkages such as yokes and the like could be employed to effect the same movement first of a primary control means and then of a secondary control means.

If desired, other steering means may be employed as indicated hereinbefore. For example, an electric motor rotating a gear and engaging a large steering pinion that is connected with one section and has a moment arm means for steering about the pivot connection can be employed. As will be apparent to one skilled in the art, when electric steering is employed, the voltage and current are controlled in the same way that pressure and volumetric rate of flow of fluid was controlled in the embodiment described hereinbefore. That is, the primary control means comprises a primary rheostat that is biased to the neutral position by a weak biasing means and is in series connection with a steering motor and a first voltage source. The secondary control means comprises a secondary rheostat that is biased to the neutral, or shut-off, position with a stronger biasing force and is serially connected with the steering motor and a second source of voltage.

The materials of construction that are ordinarily employed in the heavy duty, off-highway type construction equipment will be employed in the two speed steering system that has been described hereinbefore when the two speed steering system is employed in such off-highway vehicles. On the other hand, if the two speed steering system is adapted to smaller vehicles such as golf carts and the like, smaller components and parts may be employed, since the strength requirements will not be so high.

It can be seen that the invention provides an improvement in power steering systems for articulated vehicles that provides a slow, precise steering speed and a fast steering speed with smooth transition and feedback at all stages, thereby obviating the disadvantages of the prior art steering systems. Specifically, the invention provides a hydraulic steering system, with two sources of fluid optional, and two control valves, one of which is selectively operable by the operator of the vehicle by merely making additional demands via a steering means.

It is also apparent that the steering system, having both the primary and secondary control means is advantageous in providing an additional safety feature. Specifically, in the event that the primary control means should fail to effect steer for any reason, such as failure of the primary hydraulic pump, the secondary control means ultimately effects the desired degree of steer. Thus, a vehicle may be steered back to a primary repair location without having to advert to repair in the field under adverse conditions.

Although the invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. In a steering system for steering an articulated vehicle in which steering is effected by changing the angle of a first section with respect to a second section about a pivot connection that defines a substantially vertical axis, the improvement comprising:
   a. steering means that is movable in varying scaler magnitude in at least two directions to indicate the direction and degree of steering to be effected;
   b. power servo means connected with both said sections and having a moment arm means for effecting torque about said pivot connection for effecting the desired degree of steer in ultimate response to movement of said steering means;
   c. a primary and a secondary control means carried by one of said sections and connected with said power servo means for controlling the direction and speed with which said power servo means steers; said control means having respective first and second members that are positionable to control the direction and magnitude of an output which controls direction and speed of said power servo means; said primary control means having a weak biasing means that biases its said first member toward the shut-off position and said second control means having a strong biasing means that biases its said second member toward the shut-off position with a force sufficient to resist movement of said second member until said first member approaches its limit of travel in a predetermined direction and a supplemental resistance in addition to said weak biasing means is encountered;
   d. double bar link means pivotally connected at each end with said first and second members of said primary and secondary control means so as to move said first member to approach its limit of travel in a predetermined direction and thereafter move said second member upon further movement of said double bar link means in said predetermined direction; and
   e. interconnection means connecting said steering means with said double bar link means; said interconnection means being responsively connected with said steering means so as to move said double bar link means in a given direction a magnitude responsive to movement of said steering means a magnitude in a given direction; said interconnection means also being connected with the other section of the vehicle at a point spaced from said pivot connection so that the longitudinal axis of the portion of the interconnection means that is connected with said double bar link means is disposed at a predetermined distance from said substantially vertical axis defined by said pivot connection so as to move said double bar link means in a direction opposite to said given direction in response to the degree of steer being imparted to said sections, as determined by movement of said one section with respect to said other section.

2. The steering system of claim 1 wherein said steering means comprises a steering wheel means having a transducing gear means at its lower end for changing rotational motion into respective pivotal movement of a transverse member, and said interconnection means comprises a mechanical linkage arrangement including a transverse member extending laterally from said transducing gear means and a longitudinal member that is pivotally connected with said transverse member and pivotally connected with said double bar link means, said transverse and longitudinal members being sufficiently rigid to transmit a steering force from said steering wheel means to said double bar link means and to transmit to said double bar link means a restoring force due to steer of said one section which effects movement of said transducing gear means about said pivot connection with respect to said other section; whereby steering is automatically stopped when the signaled degree of steer has been effected.

3. The steering system of claim 1 wherein said steering means comprises a steering fluid flow control means for controlling direction and volumetric rate of flow of a fluid; said steering fluid flow control means being connected with a source of fluid and with said interconnection means via fluid flow conduits; and wherein said interconnection means comprises a hydraulic ram including a slave cylinder, piston and shaft arrangement that is physically connected with said one section and with said double bar link means and connected via fluid flow conduit with said steering fluid flow control means so as to effect an overall length L that effects movement of said double bar link means a given magnitude in a given direction in response to the direction and magnitude of steer signaled by said steering fluid flow control means and to effect movement of said double bar link means in a direction opposite to said given direction in response to the degree of steer imparted to said one section; whereby steering is automatically stopped when the signalled degree of steer has been effected.

4. The steering system of claim 1 wherein said power servo means comprises at least one hydraulic ram that is connected with both said sections at a distance laterally from said pivot connection; said hydraulic ram being connected with at least one source of fluid under elevated pressure by way of said primary and secondary control means.

5. The steering system of claim 4 wherein said primary and secondary control means comprise respective flow control valves for controlling the direction and rate of flow of said fluid under pressure to said hydraulic ram for effecting said degrees of steer.

6. The steering system of claim 5 wherein said weak biasing means comprises a weak force generating means including a first lever arm portion of said double bar link means and a light spring means in said primary control valve and said strong biasing means comprises a strong force generating means including a second lever arm portion of said double bar link means and a second spring means.

7. The steering system of claim 4 wherein said at least one source of fluid under elevated pressure comprises first and second sources of hydraulic fluid under elevated pressure.

8. The steering system of claim 7 wherein said first source of hydraulic fluid under pressure comprises a primary pump and said second source of hydraulic fluid under pressure comprises a secondary pump.

9. The steering system of claim 8 wherein said primary and secondary pumps are independently operable and said primary pump is capable of delivering said hydraulic fluid at a first pressure and a first volumetric rate of flow; and said secondary pump is capable of delivering said hydraulic fluid at a second pressure and a second volumetric rate of flow that are at least as great as said first pressure and said first volumetric rate of flow.

10. A steering system for steering an articulated vehicle in which steering is effected by changing the angle of a first section with respect to a second section about a pivot connection that defines a substantially vertical axis, comprising:
   a. a steering means that is movable in varying scalar magnitude in at least two directions to indicate the direction and degree of steering to be effected, the steering means including a source of high pressure hydraulic fluid, a valve means for directing the hydraulic fluid to a hydraulic ram employed as an interconnection means and a connection with a reservoir of hydraulic fluid for returning hydraulic fluid thereto;
   b. at least one hydraulic ram power servo means connected with both sections and having its longitudinal axis displaced a distance D from the substantially vertical steering axis defined by said pivot connection for effecting via a torque force the desired degree of steer in ultimate response to movement of the steering means;
   c. a primary control valve carried by one of said sections of said vehicle and connected via respective conduits with the piston end and the shaft end of said hydraulic ram power servo means for directing hydraulic fluid to one or the other of the ends serving as a high pressure end to effect steer in a predetermined direction at a slow, precisely controllable rate of steer, said primary control member having a first member that is positionable to control the respective conduit into which the high pressure hydraulic fluid output is to be directed and control the quantity of hydraulic fluid directed thereinto; said primary control valve also being connected with a first source of high pressure hydraulic fluid and being connected with a reservoir for return of low pressure hydraulic fluid thereto; said primary control valve having a weak biasing means that biases its first member toward the shut-off position with a first force;
   d. secondary control valve carried by said one section and connected via respective conduits with the respective piston and shaft ends of said hydraulic ram power servo means for controlling the direction and speed with which said hydraulic ram power servo means steers; said secondary control valve being connected in parallel with said primary control valve, having a conduit connection with a second source of hydraulic fluid under pressure and having a connection, in parallel with said primary control valve, to a reservoir for said hydraulic fluid; said secondary control valve having a second member that is positionable to control the conduit into which the high pressure hydraulic fluid is directed and control the quantity of hydraulic fluid directed thereinto; said secondary control valve having a strong biasing means that biases its second member toward the shut-off position with a force greater than said first force and sufficient to resist movement of said second member until said first member approaches its limit of travel in a predetermined direction and a supplemental resistance in addition to said first force is encountered;
   e. double bar link means pivotally connected at each end with said first and second members of said primary and secondary control valves so as to move said first member to approach its limit of travel in a predetermined direction and thereafter move said second member upon further movement of said double bar link means in said predetermined direction; and
   f. hydraulic ram interconnection means connecting said steering means with said double bar link means; said hydraulic ram interconnection means having conduits connecting it with said valve means of said steering means so as to position its shaft and effect a length responsively determined by the position of said steering means so as to move said double bar link means a given magnitude in a given direction responsive to movement of said steering means a given magnitude in a given direction; said interconnection means also being connected with the other section of the vehicle at a point spaced from said substantially vertical steering axis so that the longitudinal axis of the shaft of said hydraulic ram is disposed a predetermined distance from said substantially vertical steering axis to move said double bar link means in a direction opposite said given direction in response to the degree of steer being imparted to said sections.

11. The steering system of claim 10 wherein said first source of hydraulic fluid comprises a first hydraulic pump and said second source of hydraulic fluid comprises a second hydraulic pump; said second member also controls an actuation means for starting said second pump upon movement of said second member from the shut-off position.

12. The system of claim 10 wherein two hydraulic rams are employed as said hydraulic ram power servo means with respective piston end of a hydraulic ram being connected with a respective and opposite shaft end of the opposite hydraulic ram so that substantially equal quantities of hydraulic fluid flow into the high pressure ends and from the low pressure ends of said hydraulic rams.

13. The system of claim 10 wherein said valve means in said steering means comprises a geroter that serves as a valve means and also serves as a pump in the event of failure of said source of high pressure hydraulic fluid.

* * * * *